US008775415B2

(12) United States Patent
Jeon et al.

(10) Patent No.: US 8,775,415 B2
(45) Date of Patent: *Jul. 8, 2014

(54) RECOMMENDING MEDIA PROGRAMS BASED ON MEDIA PROGRAM POPULARITY

(75) Inventors: Joon-Hee Jeon, Bellevue, WA (US);
Vincent Dureau, Palo Alto, CA (US);
Steve D. Benting, San Mateo, CA (US);
Zhenhai Lin, Kirkland, WA (US);
Michael W Miller, Palo Alto, CA (US);
Manish G. Patel, San Francisco, CA (US)

(73) Assignee: Google Inc., Mountain View, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 13/613,426

(22) Filed: Sep. 13, 2012

(65) Prior Publication Data
US 2013/0007792 A1    Jan. 3, 2013

Related U.S. Application Data

(63) Continuation of application No. 11/844,883, filed on Aug. 24, 2007, now Pat. No. 8,275,764.

(51) Int. Cl.
G06F 7/00 (2006.01)
G06F 17/30 (2006.01)

(52) U.S. Cl.
USPC .......................................................... 707/721

(58) Field of Classification Search
None
See application file for complete search history.

(56) References Cited

U.S. PATENT DOCUMENTS

| 4,963,995 | A | 10/1990 | Lang |
| 5,010,499 | A | 4/1991 | Yee |
| 5,121,476 | A | 6/1992 | Yee |
| 5,589,892 | A | 12/1996 | Knee et al. |
| 5,793,438 | A | 8/1998 | Bedard |
| 5,805,235 | A | 9/1998 | Bedard |
| 5,808,694 | A | 9/1998 | Usui et al. |
| 5,903,816 | A | 5/1999 | Broadwin et al. |
| 5,940,073 | A | 8/1999 | Klosterman et al. |
| 6,002,394 | A | 12/1999 | Schein et al. |
| 6,005,562 | A | 12/1999 | Shiga et al. |
| 6,005,565 | A | 12/1999 | Legall et al. |
| 6,014,184 | A | 1/2000 | Knee et al. |
| 6,147,715 | A | 11/2000 | Yuen et al. |

(Continued)

FOREIGN PATENT DOCUMENTS

JP    2008-78946    4/2008
WO    WO01/24047    5/2001

(Continued)

OTHER PUBLICATIONS

Sarwar et al. "Item-based collaborative filtering recommendation algorithms," Proceedings of the International Conference on World Wide Web, 2001, pp. 285-295.

(Continued)

Primary Examiner — Uyen Le
(74) Attorney, Agent, or Firm — Fish & Richardson P.C.

(57) ABSTRACT

A computer-implemented method includes receiving information expressing a user's interest in one or more media programs, obtaining information indicative of popularity for a plurality of media programs responsive to the received information by individuals other than the user, and transmitting one or more recommendations of media programs for display to the user, from the plurality of media programs that relate to the received information.

24 Claims, 10 Drawing Sheets

(56) References Cited

U.S. PATENT DOCUMENTS

| | | |
|---|---|---|
| 6,233,389 B1 | 5/2001 | Barton et al. |
| 6,263,501 B1 | 7/2001 | Schein et al. |
| 6,483,548 B1 | 11/2002 | Allport |
| 6,493,878 B1 | 12/2002 | Kassatly |
| 6,640,337 B1 | 10/2003 | Lu |
| 6,769,128 B1 | 7/2004 | Knee et al. |
| 7,152,061 B2 | 12/2006 | Curtis et al. |
| 7,328,450 B2 | 2/2008 | Macrae et al. |
| 7,493,015 B1 | 2/2009 | Van Stam et al. |
| 7,627,882 B2 | 12/2009 | Finseth et al. |
| 7,685,619 B1 | 3/2010 | Herz |
| 7,734,680 B1 | 6/2010 | Kurapati et al. |
| 8,005,826 B1 | 8/2011 | Sahami et al. |
| 8,275,764 B2 | 9/2012 | Jeon |
| 8,484,192 B1 | 7/2013 | Sahami et al. |
| 8,522,281 B1 | 8/2013 | Sahami et al. |
| 2002/0103789 A1 | 8/2002 | Turnbull et al. |
| 2002/0108113 A1 | 8/2002 | Schaffer et al. |
| 2003/0014759 A1 | 1/2003 | Van Stam |
| 2003/0115585 A1 | 6/2003 | Barsness et al. |
| 2005/0144499 A1 | 6/2005 | Narahara et al. |
| 2006/0026642 A1 | 2/2006 | Schaffer et al. |
| 2007/0078849 A1* | 4/2007 | Slothouber ............ 707/5 |
| 2007/0136753 A1 | 6/2007 | Bovenschulte et al. |
| 2008/0270449 A1 | 10/2008 | Gossweiler et al. |
| 2008/0270886 A1 | 10/2008 | Gossweiler et al. |
| 2008/0271078 A1 | 10/2008 | Gossweiler et al. |
| 2008/0271080 A1 | 10/2008 | Gossweiler et al. |
| 2009/0055385 A1 | 2/2009 | Jeon et al. |

FOREIGN PATENT DOCUMENTS

| | | |
|---|---|---|
| WO | WO02/11445 | 2/2002 |
| WO | WO02/37839 | 5/2002 |
| WO | WO02/37851 | 5/2002 |
| WO | WO2004/100033 | 11/2004 |
| WO | WO2006/051492 | 5/2006 |
| WO | WO2007/033358 | 3/2007 |
| WO | WO2007/070422 | 6/2007 |

OTHER PUBLICATIONS

Authorized Officer S. J. Choi. International Search Report and Written Opinion in International Application No. PCT/US2008/073883, mailed Mar. 10, 2009, 11 pages.

Extended European Search Report in European Application No. 08798385.4, dated Jul. 30, 2012, 7 pages.

International Preliminary Report on Patentability in International Application No. PCT/US2008/073883, mailed Mar. 4, 2010, 6 pages.

Chinese Office Action in Chinese Application No. 200880111967.X, dated Dec. 11, 2012, 12 pages.

Japanese Office Action in Japanese Application No. 2010-522033, dated Dec. 11, 2012, 13 pages.

U.S. Appl. No. 11/742,148, filed Apr. 30, 2007, Aggregating Media Information, Mehran Sahami et al.

U.S. Appl. No. 11/742,417, filed Apr. 30, 2007, Real Time Feeds in Program Guides, Richard C. Gossweiler III et al.

U.S. Appl. No. 11/742,515, filed Apr. 30, 2007, Electronic Program Guide Presentation, Richard C. Gossweiler III et al.

* cited by examiner

RECOMMENDING MEDIA PROGRAMS BASED ON MEDIA PROGRAM POPULARITY

CROSS REFERENCE TO RELATED APPLICATION

This application is a continuation application of, and claims priority to, U.S. patent application Ser. No. 11/844,883 U.S. Pat. No. 8,275,764, filed on Aug. 24, 2007, entitled "Recommending Media Programs Based on Media Program Popularity". The disclosure of the foregoing application is incorporated herein by reference in its entirety.

TECHNICAL FIELD

This document discusses systems and methods for providing viewers and listeners of media programs with media-based recommendations, such as for television shows and movies.

BACKGROUND

Internet searching has become perhaps the most-performed activity on the World Wide Web. Various search engines may crawl web-accessible documents, index them, and deliver links to them in response to related requests received from users. Search results may be based, for example, on commonality of terms between a search request and words or phrases in a particular document (or synonyms of the words or phrases), and/or upon links between various pages, as with the Google® PageRank™ system. Internet users may conduct searches, for example, on media-related properties, such as television programs, music, and movies. Alternatively, users of the Web may receive recommendations, such as reviews of books, consumer products, and other items, from various other users.

SUMMARY

This document describes systems and methods that may be employed to assist users in finding media programming in which they may have an interest, and that can provide additional information about, or access to, that programming. Generally, the systems and methods permit, in certain implementations, for a user to obtain recommendations about media programs. Generally, such recommendations differ from data like search results, in that search results are a response to an explicit request, whereas recommendations are one or more steps removed from the specific request, and are based more on inferences gleaned from specific requests and other information.

For example, a user's search requests may be compared to other search requests to find users with common interests to the first user, and media-based preferences of those other users (gleaned, for example, from their media-based search requests or from programs they have queued in personal programming directories) may be used to form recommendations for the first user. In one particular example, recommendations may be made using popularity information gleaned from web search and click data. In addition, audience measurement data (e.g., television ratings data) may be used, and data to be used for recommendations may transition from audience measurement data to web search and click data as additional web search and click data becomes available over time. Other techniques, approaches, and systems for making media-based recommendations are also described here.

In one implementation, a computer-implemented method is disclosed. The method comprises receiving information expressing a user's interest in one or more media programs, obtaining information indicative of popularity for a plurality of media programs responsive to the received information by individuals other than the user, and transmitting one or more recommendations of media programs for display to the user, from the plurality of media programs that relate to the received information. The received information may comprise an explicit query, and may include information indicative of media programs viewed by the user. The method may also comprise generating data for displaying an electronic program guide grid that includes the one or more recommendations. Also, the information indicative of popularity can comprise search activity or click activity related to the search activity, or information indicative of popularity may comprise audience measurement data. In other instances, the information indicative of popularity can comprise search activity or click activity related to the search activity, and the one or more recommendations can be selected based on a weighting determined by a quality measure of the search activity or click activity.

In certain aspects, the method further comprises obtaining information indicative of audience participation and web search activity relating to media programs, and making a recommendation substantially using the audience participation data if the web search activity does not permit making a recommendation of sufficiently high quality. Also, the method can include analyzing past activity by the user to determine topics of interest to the user, and making recommendations of programs associated with the topics of interest. Moreover, the method can also include determining co-dependency between the user's interest and the plurality of media programs using collaborative filtering.

In another implementation, a computer-implemented system is disclosed. The system comprises memory storing data relating to popularity of one or more media programs, an interface configured to receive media-related requests, to generate responses to the requests, and to generate recommendations different from the responses, wherein the recommendations include information about the one or more media programs and are based at least in part on the popularity of the one or more media programs, and a programming guide builder to generate code for constructing a programming guide containing programs responsive to the media related requests and displaying popularity indications for the programs in the guide. The recommendations can be generated from a combination of web activity data and audience measurement data. Also, the interface can be configured to transition from applying audience measurement data to applying web search activity data as a quality measure of the web search activity data improves.

In some aspects, the system can include a collaborative filter for determining co-dependency relationships between users and media programs. Also, the data relating to popularity can comprise web activity data and audience measurement data associated with the media programs. The programming guide can comprise a listing of upcoming episodes of programs identified by the recommendations, and the system may further comprise a collaborative filter for determining co-dependency among programs of the one or more media programs, for use in generating the recommendations.

In yet another implementation, a computer-implemented system comprises memory storing data relating to popularity of one or more media programs, means for generating recommendations from the media programs in response to a user submission of a media-related identifier, and a programming guide builder to generate code for constructing a programming guide containing programs relating to the recommendations. The data relating to popularity can comprise web activity data and audience measurement data associated with the media programs. Also, the programming guide can comprise a listing of upcoming episodes of programs identified by the recommendations.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
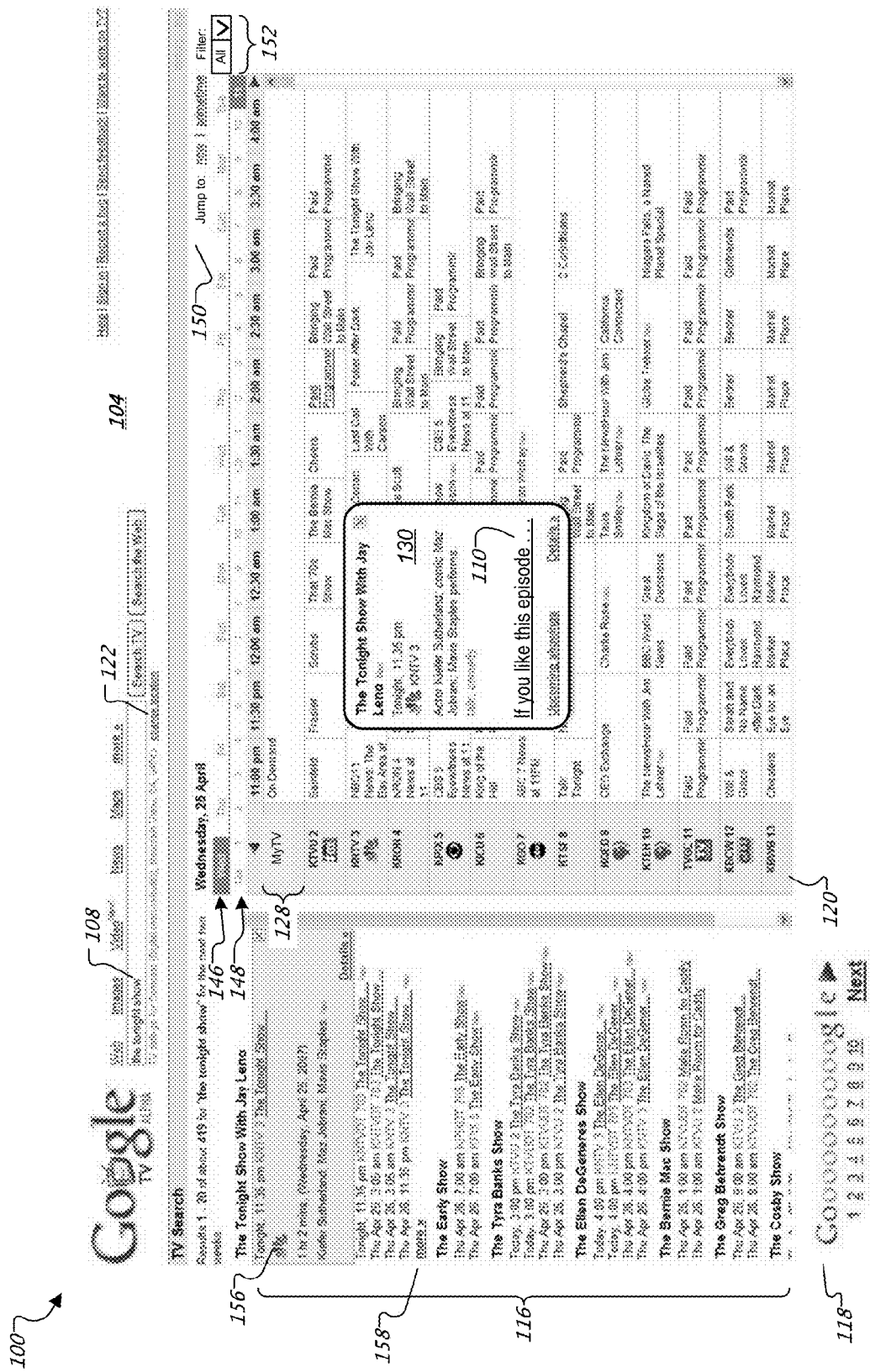
FIG. 1A is an example screen shot showing recommendations associated with a television episode.
Figure 1B:
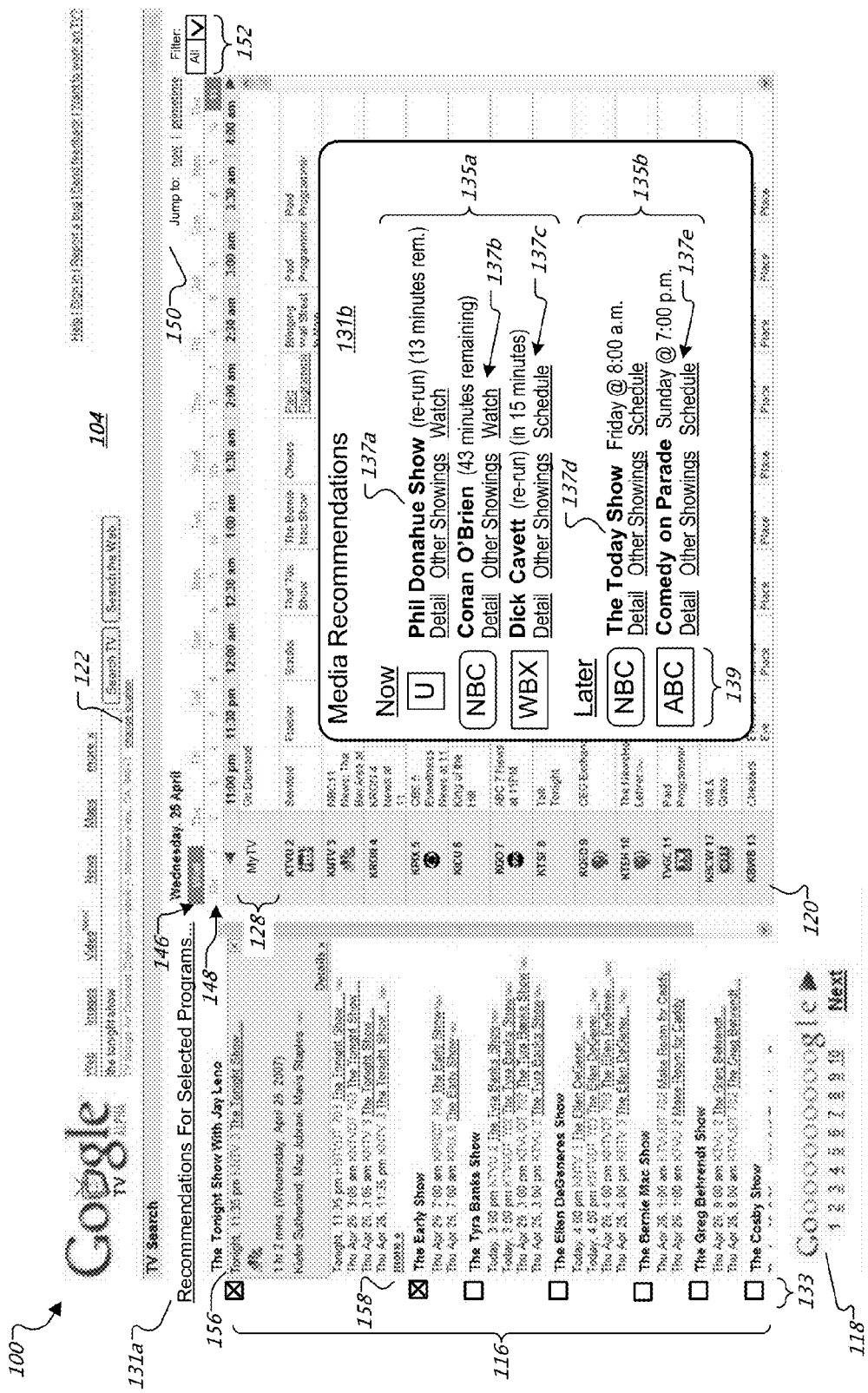
FIG. 1B is an example screen shot showing recommendations associated with multiple media programs in a search result list.
Figure 1C:
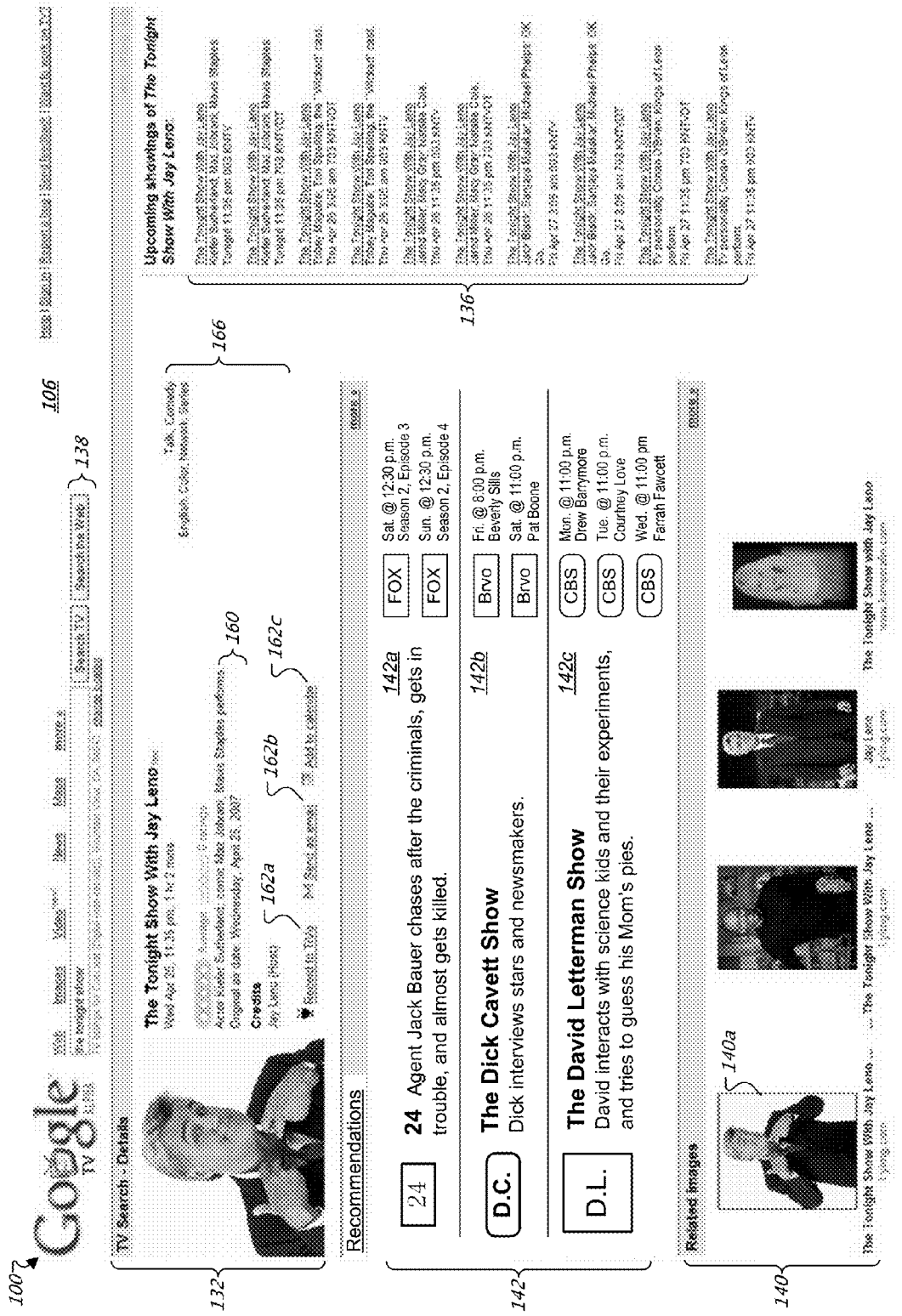
FIG. 1C is an example screen shot showing recommendations associated with a television program.

FIGS. 1A-1C show various screen shots from a system for generating media-related recommendations, such as recommendations for movies, music, television programs, and the like. Media-related recommendations are suggestions provided to users regarding programs, movies, songs, etc., that they are likely to enjoy. Recommendations are different from search results, in that the latter are a direct response to a specific query, while the former may be much more general. Specifically, recommendations are related to, but are not provided as part of, a search result list.

Generally, recommendations depend on some sort of identified co-dependency between two objects. For example, the objects can be two users or two TV programs. Where the objects are two users, a first user's interests can be tracked, other users with similar interests can be identified, and then additional topics that may interest those other users can be recommended to the first user. Where the objects are two TV programs, the actual content of the programs can be analyzed to find similarities. For example, two programs may share certain actors, or they may share a particular genre. Multiple such parameters may be shared between two programs, making their correlation even greater.

Recommendations may be generated with or without explicit user input. For explicit input, a user may enter a search query, and recommendations may be generated in response to the entry of the search query. For non-explicit, or implicit input, the recommendations may look to data related to a user that is not from a formal submission of a query by the user. Recommendations may be generated, for example, while a user is reviewing an electronic program guide, such as while watching television. For example, while the electronic program guide is displayed, recommendations may also be displayed that are based, for example, on the programs in the electronic program guide and/or other parameters. Also, a recommendation may look to a program the user is watching and/or programs the user has watched, in generating a recommendation (such as by changing a user's channel to another program when they are finished watching a first program).

The basis by which recommendations are generated may change over time. For example, recommendations for a new show may be based initially on various measures of audience size and participation, or other such information that is available early in a program's life. As the show becomes more established over time, the basis of the recommendations may transition, at least in part, to search data or click-through data from a public search engine. Such data may be available later in the program's life, after sufficient such data has been gathered from user input.

For example, recommendations may be based on input received on the Internet from several users who may have watched the show, visited web sites related to the show, provided user feedback related to the show, etc. Such data shows user interests, so that recommendations to a first user may be based on other users who have provided similar search terms for general topics or for media-related topics, and may be generated from other media-related activity by those other users. As a simplified example, if a requesting user has entered searches for "Jaws," "Orca," and similar terms, a system may look for other users who have made similar queries, and may then look for commonality in other media-related queries submitted by those other users. For example, perhaps many of those users have also searched for "Star Trek" or "Leonard Nimoy," or have numerous Star Trek episodes cued up in a personalized channel (such as attached to a personal video recorder (PVR)). As a result, the first user may receive a recommendation for a Star Trek (or other sci fi) movie.

Jaws is an old movie, however, as is Star Trek. For media-programs that are very recent, in contrast, there may be insufficient search or click data to make statistically satisfactory decisions about users' preferences. In such a case, popularity data (e.g., ratings data) from a structured database may be used. For example, a new television program may be classified into a "sci fi" genre and its ratings data may show that it is explosively popular. If a first user has been observed to watch many sci fi programs, the new program may be recommended initially based solely on its genre and popularity. After time, the recommendation data may transition, either immediately or gradually, to later-developed data such as search data. Thus, for example, perhaps the new sci fi program was heavily advertised and received great ratings numbers its first week, but nobody liked it. Subsequent search data would indicate a lack of interest, and could permit a system to lower the quality of the program in terms of making recommendations. In some implementations, weighting factors can be used so that the recommendation engine can apply different percentages of some approaches when multiple approaches are used in combination.

Also, where a new program is a new episode of an existing series, its relevance may be extrapolated to other programs or series based on the relevance of its hosting series. For example, if a new episode of the Friends sitcom is set to air soon, the series ID for Friends may be used to identify recommendations for programs like Seinfeld or Full House that are judged to be similar shows, and those programs may be recommended without knowing about any program-specific relevance. Likewise, the various techniques for forming recommendations above and below may be mixed, such as by giving a particular weight to each technique in forming a composite score for programs in making recommendations.

Recommendations can be made, for example, using a recommendation engine as part of a computer-based system, such as a system using central servers to provide a number of different services, such as search, maps, shopping, and other such services. Two example categories of approaches can include "collaborative filtering" and "content-based recommendation." Collaborative filtering can also be referred to as "behavioral data-based recommendation" because it uses input from many users to "train" the recommendation engine. The content-based recommendation approach generally involves analyzing the content itself to determine similarity of items.

The collaborative filtering approach, based on data received from many users, trains the recommendation engine because inputs are received iteratively over time. The collaborative filtering approach can use different models for making recommendations. A user-based model (or memory-based model) can make recommendations based on the similarity of the users. In one example, the similarities among users may be derived using information in the users' user profiles.

Another model that the collaborative filtering approach can use in making recommendations is the item-based model. Also known as "model based," the item-based model can determine the similarities or relationships between items by clustering them or by calculating the conditional probability of items. One such popular algorithm is Bayesian Network and Bayesian clustering.

The source data used for collaborative filtering-based recommendations can come from different sources, such as, for example, audience measurement data from a TV provider or web-click data or other web activity data. One advantage of using audience measurement data from a TV provider is that it can be available fairly quickly, such as within days (e.g., a week) after a new TV show airs. Such availability can make it possible to provide recommendations without having to wait until enough web-click data is accumulated. Web-click data or other web activity data can have the advantage that the data format is relatively stable, which can minimize the need to adjust to new data formats. In addition, web activity data may be available without having to purchase access to popularity data or set up an often complex system for gathering the popularity data.

A common problem for collaborative filtering can be "lack of data" for newly registered users and newly added items. This problem, often called the "cold start problem," can be mitigated by following the "content based recommendation" approach. The content-based recommendation approach can analyze the content itself to determine the similarity of items. Three models for mitigating such a problem are described here as examples.

One model used for the content-based recommendation approach is to make recommendations based on a combination of genre data (e.g., from an electronic program guide (EPG) provider) and ratings-based popularity data (e.g., for stations and/or programs). The model can use genre field values to find sets of similar programs. The sets may then be ranked by popularity of the station (e.g., where the program airs) or popularity of program itself (e.g., if such data is available). Programs that are series may be treated either at the series level or the episode level, or both. For example, when a new episode for an existing series airs, it may be assigned popularity data reflective of the series as a whole, but the data may transition over time into a reflection of the popularity of the episode, or some blend of the episode and the series (particularly when it is difficult to separate actions by users that indicate popularity of a series from popularity of an episode). Also, programs, such as in the form of episodes, may be organized into common clusters other than a group of episodes in a series. Moreover, although relatively implicit indications of popularity (e.g., clicking and ratings) are discussed here, more explicit indications, such as "5 star" ratings systems or other user ratings may be used.

A second model used for the content-based recommendation approach can use a filter to analyze the similarity of the programs. The filter can determine "matching clusters" of the programs to determine set of programs that fall into the same category (or cluster). The filter may use data such as program summaries or episode synopses or other available data.

A third model used for the content-based recommendation approach is to apply extra data to a filter process to produce better clustering. For example, a system may apply machine learning techniques to analyze the content of a document to determine one or more concepts of the document, in order to be able to locate a relevant document. In a media search setting, such analysis may be performed on various data relating to a program. Such extra data may include, for example, closed caption data, blogs, or some web site content that extensively describes the program. In this sense, this third model is an extension of the second model. One advantage of using this model is that it can offset the lack of program description available in the source data from most EPG data providers. The lack of adequate descriptions can negatively affect the quality of filter-based recommendations because the filter performs clustering using keywords (e.g., using keywords available from program descriptions). Using keywords derived from closed captions, blogs, or web sites can improve recommendations when program descriptions are inadequate or unavailable.

The recommendation engine may be used, for example, when the user is performing query-based searches for media content. Such user searches may, for example, be submitted when a user is using an electronic program guide. In addition to displaying the electronic program guide, the system may include additional displays that provide recommendations to the user. The recommendations may be based, for example, on the present query from the user, on all queries from the current session of the user, or from a longer period of queries from the user.

Referring now to FIG. 1A, there is shown a program guide system 100 that allows a user to search for media programming (e.g., broadcast television, cable television, satellite television, broadcast radio, satellite radio, and Internet media) by making a search request using a search page. The program guide system 100 presents, such as on the search results page (not shown) and/or on landing page 104, search results that are based on the search request. The system 100 also presents associated media recommendations to the user, for example, using recommendation displays 130 of FIG. 1A, 131*a* and 131*b* of FIG. 1B, and 142 of FIG. 1C. The particular displays shown here are intended merely to provide an example of how a user may provide information for receiving media-related recommendations, and may receive such recommendations in response. Other mechanisms for obtaining indications of user interest in particular programs or other topics, and for presenting recommendations, may also be employed.

The recommendations displays 130, 131*a*, 131*b* and 142 each show a different way of generating and displaying recommendations and/or handling a request to display recommendations. The recommendations display 130 simply ties to a particular episode of a television program (e.g., tonight's episode of The Tonight Show with Jay Leno), so it looks to information associated with that episode in finding related media programming that could serve as recommendations. For example, because Kiefer Sutherland is a guest on the particular episode of the Tonight Show, the recommendations may relate to the vampire-comedy movie Lost Boys or the TV drama series 24, each of which feature Kiefer Sutherland.

In recommendations displays 131*a* and 131*b* of FIG. 1B, the base is a combination of multiple programs or multiple episodes. In this case, the system may tend not to look at episode details (though it may, so as to find additional commonality between and among the selected shows to make for a better recommendation). Instead, the recommendation engine may look at general information that describes the programs (e.g., genre, starring actors, etc.), draw commonality among all such topics to identify common topics, and then identify other programs that share such topics. In this sense, the recommendation engine may function similarly to Google's Adsense (e.g., identifying topics for a web page from words on the page, and then trying to match those topics with topics that are related to keywords identified by an advertiser).

To see the recommendations, the user may select a recommendations link 110. Recommendations displays 131*a* and 131*b* relate to a group of programs, such as one or more series (e.g., The Tonight Show, The Early Show, etc.), and thus gather information about the programs in general, for example by using a structured data source such as the Internet Movie Database (IMDb).

Specifically, the recommendation link 131*a* can be used to initiate the media recommendations display 131*b* for specific entries. Recommendations display 142 relates to a particular program, but not necessarily about a particular episode of the program. Thus, the genre of the program may be used, as may the names of starring actors, but particular plotlines or guest actors may not be used in determining what other programs might bear a relation to the main program. Recommendations displays 130, 131*a*, 131*b* and 142 are described in more detail below.

The system may use other "signals" in making a determination about a user's goals. For example, a user's profile may be used in combination with a search term in generating recommendations. Specifically, if the user's profile includes information that the user is a movie enthusiast, a query term that includes Kiefer Sutherland may be used in combination with the movie enthusiast information to recommend the movie Lost Boys.

Profiles can be generated for a user and updated over time based on input explicitly provided by the user and selections made by the user (e.g., web sites visited, user clicks on those web sites, etc.). Profiles may be, for example, maintained in social networking or other sites. If a user subsequently enters a search term that in some way is related to user profile information, the recommendation engine can automatically combine the information to generate recommendations that may interest the user.

In one example using user profiles, collaborative filtering techniques can be used to identify wants of other people having profiles similar to those of the user. For instance, for someone who identifies himself as being between the age of 19 and 25, the system may look for TV programs that share certain characteristics of a particular TV show (e.g., the Tonight Show or whatever resulted from the user's search) within that demographic (e.g., ages 19-25). The system may use information based on high ratings from the youth demographic. The system may further use information from TV shows that have generally higher amounts of search submissions or click-throughs from other people who identify themselves as being young in their profiles.

In some implementations, media other than TV programs (e.g., songs, and movies) can be recommended. For example, while the user may enter and submit specific query terms to search for particular types of TV programs, the recommendation engine may further provide recommendations for movies, music, or the like that may interest the user. Such non-TV recommendations may be separate from, or integrated with, TV program recommendations.

In some implementations, the user may be able to configure the electronic program guide—in particular the recommendation engine—to recommend certain types of media content. For example, the user may be interested in TV and movies, but may have no interest in music CDs. Using user-controlled settings on the electronic program guide, the user may indicate to the recommendation engine to not include music CDs when making recommendations. Other user-controllable settings may also exist that allow the user to customize and/or improve the user experience of the electronic program guide, and in particular, the recommendation engine. In addition, the system may learn over time that certain recommendations are not useful to a user, such as if the user seldom or never clicks on links for such recommendations, and the system may then demote (i.e., move down in a group of results) or remove such recommendations.

When a user enters a media-related search query, the system 100 may determine that the query is media related (e.g., by comparing it to a white-list of media-related terms) and may present media-related search results. The search results may include, for example, a list of web pages having information related to the search term. In addition, the search results may include a list of media programming related to the search term. The media programming list may include text, such as "Local TV Listings," that identifies items in the list as media programming, as opposed to web page items. The media programming list may also include one or more media icons that indicate the types of media programming presented in the list, e.g., a television, radio, or webcast icon. The system can group the media results in a manner that differs from an ordinary list of search results. Specifically, each of the results may be shown with a title, time, and channel, whereas standard search results may be shown with a title, snippet, and URL. This special formatting of a search result on a search results page may be referred to as a "one box." Other search results, such as weather, location, and similar results may also be presented in a specially-formatted one box.

The program guide system 100 may present a landing page 104, as shown in FIG. 1A, in response to a user selection of an item in a search result. The landing page 104 includes a search box 108 where a user may input a search term, such as a portion of a television program name, so as to generate an updated landing page responsive to the entered search term.

The landing page 104 includes media result groupings 116. The groupings 116 list one or more collections of programs related to a search term. The groupings 116 group collections of programs, for example, by program name with each item in a grouping being a particular episode or airing of the program.

Alternatively, the groupings 116 may be grouped using another parameter, such as grouping by the media channel presenting the programs, a genre of the programs, or the time of day the programs are presented. An additional results control 118 allows a user to navigate to other groupings that are not currently displayed, and that may be groupings considered to be less responsive to the user's request.

Each of the groupings 116 may also include a "more" control 158 that lists additional results within the particular grouping. In the pictured example, the three next-pending programs are shown for the media grouping associated with entry 156 for the television program "The Tonight Show", and a user can select the "more" control 158 to show addition programs further in the future. Such a selection may cause the Tonight Show grouping to expand and may also cause the other groupings to be removed to make room for the expanded grouping.

The groupings can also include an "Add to My TV" control that, when selected, can add a particular program (such as a series of episodes) or episode to a personalized program guide for the user. For example, a "My TV" channel may be maintained for a user, as described below, and an episode or all the episodes of a program may be added to that channel when the "Add to My TV" control is selected.

The landing page 104 also includes a schedule grid 120. The schedule grid 120 is displayed adjacent to and side-by-side with the groupings 116. The schedule grid 120 presents programming for a particular geographic location. A user may specify or change his or her location by selecting a change location control 122 and by making an input, such as a postal code (e.g., a ZIP code) or city and state names. The selected location may also be used to determine the programs presented in the groupings 116. Where the user is a user registered with the system 100, the user's default location may be used to generate programming suggestions.

The schedule grid 120 presents media programming for a particular time range on a particular date, such as over several hours. A user may select the date using a calendar control 146. The calendar control 146 may default to a particular date, such as the current date. When a search is performed, the grid 120 may default to the area surrounding the time and channel of the episode determined to be a best search result. Selection of other episodes in the groupings 116 may cause the grid to move automatically to display programs around the selected episode (or the first-returned episode for a particular grouping, if a grouping is selected).

The schedule grid 120 presents a list of media channels vertically along its left side and times of day horizontally along its top side in a time bar 148. The programs or episodes for a particular channel are presented in the channel's row and in a column having a time division closest to the actual time that the program is presented by its associated channel. The channels may be associated with a particular numerical channel for a broadcast, or may be a virtual channel such as a personalized channel or a stream of information over the internet.

The schedule grid 120 also includes a personalized channel 128, termed here as "My TV." The personalized channel 128 includes controls that allow a user to create a virtual channel using content from actual channels or another personalized channel, such as the personalized channel of another user. Episodes or programs may be added to the personalized channel 128 in a variety of ways. For example, A user may select a program in the schedule grid 120, and may select a command to move it to the personalized channel 128 or may drag it to the personalized channel, among other things.

Also, one user may send a message to another user that identifies a particular program, such as by supplying a URL to an online video, supplying an episode ID number, or through another accepted mechanism. In addition, the user may select a control such as the "Add to My TV" control, where that control is associated with a program or episode.

The schedule grid 120 includes the personalized channel 128. The personalized channel 128 is presented near the top of the grid 120 and slightly separated from the other channels to indicate that its programs are specified by the user rather than by a media provider broadcast. The personalized channel 128 can include multiple overlapping programs, and a user may be provided with various mechanisms with regard to watching and managing such programs. As one example, the programs may be displayed initially according to the times they are broadcast or are first made available for download. The user may then drag them later into time so that they do not overlap, so as to "program" a viewing schedule that the user may later follow.

Programs that are shifted in time from their actual broadcast time may be recorded when they are broadcast, such as by a PVR, and may be displayed according to the program the user has established. In this manner, a user can easily select programs to view, see whether the selected programs can be viewed when they are broadcast, and view the programs in a selected order as if they were live programs, but by time-shifting the programs in some selected manner.

Recommendations display 130 may be displayed, for example, when the user selects or hovers over the corresponding cell in the grid 120. When the recommendation display 130 is shown, it may contain more detailed information than that which is displayed in the grid 120. The display 130 also includes a recommendations link 110 (i.e., "If you like this episode . . . ") that the user can select to view recommendations based, at least in part, on the episode displayed in the cell 130. For example, if the Tonight Show With Jay Leno is displayed in the cell 130, the user can click on the recommendations link 110 to see one or more recommendations related to the Tonight Show (and perhaps based on other signals such as personalized information relating to the user). Such recommendations may be displayed, for example, on the details page 106 of FIG. 1C.

Referring to FIG. 1B, the landing page 104 may include different types of recommendations areas or displays. Specifically, the landing page 104 can include a recommendations link 131a that can be used to access recommended media programming corresponding to the media result groupings 116. The groupings 116 may correspond to programs displayed in the grid 120. The recommendations display 131a may, for example, include a title "Recommendations for Selected Programs" and be positioned above schedule entries such as schedule entry 156. Checkboxes 133 may be included adjacent to entries in the schedule entries 156. The user may use the checkboxes 133, for example, to control the experience of receiving additional recommendations. For example, by checking individual checkboxes 133, the user may control the extent to which recommendations are included on the details page 106.

Recommendations area 131b is also provided to display recommendations generated in response to selection of recommendation display 131a. Recommendations area 131b can be split into different sections, such as a "Now" listings area 135a and a "Later" listings area 135b. As depicted, individual listings 137a-137e identify other late night talk shows that may be recommended, for example, because they are in the same genre as the Tonight Show With Jay Leno and the Early Show (the two programs identified by the user with check mark selections). The listings in the recommendations area 131*b* can also include network icons 139 which visually identify the particular channel on which the TV show airs.

Referring now to FIG. 1C, a details page 106 may be displayed when a user selects a particular program or episode so as to indicate an interest in seeing more detailed information about that program or episode. The details page 106 includes a program details area 132 which itself includes an upcoming episodes area 136. The upcoming episodes area 136 presents a list of the upcoming episodes for the program. The list may include detail information such as an episode title, a time for the showing, and a channel on which the showing is to occur. The details page 106 also includes a search control 138. The search control 138 allows a user to input a search term to initiate a search for a particular program. The search may be limited just to a corpus of information associated with programming, or may be performed on an entire web page corpus, depending on a selection from the user.

The details page 106 also includes an image details area 140. The image details area 140 presents images associated with the program, such as image result 140*a*. The image result 140*a* may be found by performing an Internet search for images related to the program, such as would be returned by the standard "Google Images" service. The search may be constrained in particular ways, such as by searching on a particular programming-related corpus of images or by adding certain terms, such as "television" to the query so that "Fred Thompson" returns images of the actor and not of other people. Details including a snippet, image details, and a URL that displays the image, are also provided in image details area 140.

The details page 106 also includes a recommendations display 142 or area. The recommendations display 142 may list TV shows that are recommended to the user based on the selected Tonight Show with Jay Leno. The display 142 includes individual recommendation entries 142*a*-142*c*. For example, the recommendation entry 142*a* identifies the TV series 24, which in this case may be recommended to the user because of its association with Kiefer Sutherland—a guest on this particular episode of The Tonight Show. Other talk shows are also shown, because of their similarity in genre to The Tonight Show. The recommendation entry 142*a* can further include a summary of the episode and one or more specific entries for current or upcoming episodes that may interest the user. In particular, the entries can identify the broadcasting station (e.g., Fox, CBS, etc.), specific episode dates and times, a summary of the episode, actors or guests, and so on. Controls may also be provided so that the user can access more recommendations and/or episodes.

In operation, a user may initiate the program guide system 100 either by inputting a search term, such as "The Tonight Show," for a general web search using the search control 108 or a media programming search using the search control 138. In the case of the search control 108, the program guide system 100 presents the list of programs related to the search term "The Tonight Show" within the search page as part of a one box. Selecting a program in the list directs the user to the landing page 104.

Alternatively, a user may input the search term for "The Tonight Show" using the media programming search control 138, such as is displayed on the landing page 104 or the details page 106. The search input directs the user to the landing page 104.

At the landing page 104, a user may direct the schedule grid 120 to a particular channel, time, and date by selecting a program from the groupings 116. The groupings 116 are programs determined using the search term "The Tonight Show." Each program grouping includes one or more episodes of that particular program. The user may navigate to groupings not currently presented using the additional results control 118. Selecting a particular episode in a program grouping directs the schedule grid 120 to a particular channel, time, and date. The user may also navigate through the schedule grid 120 manually using controls, such as the calendar 146 and the time bar 148. In addition, the user may "drag" the cells in the grid 120 up, down, left, or right similar in manner to moving a map in Google Maps.

Regarding a third grid dimension for detail level, such a dimension may be implemented in various manners. In one such implementation, at a least detailed level, a program title and little more may be shown in a grid so as to permit maximum density of tile display. At a more detailed level, a rating and a short description of an episode may be shown. At a yet more detailed level, more detailed description may be shown, and an image may be shown. At a more detailed level, information duplicating or approaching that shown for the detail page 106 may be shown, and may include recommendation information The user may navigate to the details page 106 (see FIG. 1C) for a particular program by selecting (e.g., clicking or double-clicking on) the program in the schedule grid 120, such as the selected program cell 130. At the details page 106, a user may view detailed information regarding the program in the program details area 132. The detailed information may be obtained, for example, from a structured database that organizes media content according to programs, actors, and other similar parameters and links the information in a relational manner.

The user may view images related to the program in the image details area 140. The images may be obtained from a structured database, such as a database associated with the detailed information, or may be obtained from disparate sources such as in the manner of Google Image Search. The user may navigate to an image by selecting an image result, such as the image result 140*a*.

In certain implementations, a user may select a program instance or episode in the schedule grid 120 to generate a new list of programs in the media result groupings 116 related to the selected schedule grid program. In such a situation, the selected program name or another program attribute may be submitted as a programming-directed search request to the system in generating a new landing page 104. For example, if a user selects the cell for "South Park," the grid 120 may re-center on that cell, and the groupings 116 may include programs such as "Beavis & Butthead," (another animated comedy), "The West Wing" (because of the directional South/West reference), and other similar programs.

Programs in the schedule grid 120 that also appear in the groupings 116 are highlighted to indicate that they match the search criteria that generated the groupings 116. Programs may also be highlighted in a similar manner if they are a program, not part of the search result, but a recommended program for a user. The highlighting may be, for example, a shading, color, grid cell size, or cell border thickness that differentiates the schedule grid programs satisfying the search condition from schedule grid programs that do not satisfy the search condition. In certain implementations, the shading, coloring, or sizing varies based on, for example, the closeness of the match between the search term and the program. The shading, coloring, or sizing may also vary with the degree of separation between programs matching the search term and programs related to the matching programs. One manner in which such closeness or separation may be shown is by relative colors of the cells in a grid, similar to the display of a thermal map, with colors ranging steadily from blue (farthest) to red (closest), or another appropriate color scheme.

The schedule grid 120 has an associated calendar control 146. The calendar control 146 includes tabs that allow a user to select a particular date or day of the week. Each tab includes hours of the day associated with the tab. Selecting a time interval in the tab directs the schedule grid 120 to present programs for the selected day and time interval.

The schedule grid 120 has a time bar 148 that indicates the times of day that programs in the schedule grid 120 are presented. The time bar 148 includes controls that allow a user to move to an earlier or later time or date. Alternatively, a user may move the schedule grid 120 by another method, such as by clicking on the grid 120 and dragging the grid 120 to a new time or date. The clicking and dragging may also move the grid 120 to present other channels. Alternatively, a user may use a control, such as a scroll bar, to move through the list of channels in the grid 120. As a user moves through times, dates, and channels in the grid 120, the landing page 104 may download data for channels and times/dates outside the periphery of the grid 120. This allows the grid 120 to present the programs for the channels and times that appear as a user moves the grid 120, without having to pause to download them.

The schedule grid 120 has an associated jump control 150 and an associated filter control 152. The jump control 150 allows a user to quickly move to the current time and date in the grid 120 or to a primetime (e.g., 8:00 PM) for the current day. The filter control 152 can be used to filter out various parts of the grid. For example, the filter may be used to show only prime time or late night programming, so that, for example, the grid jumps from 11:00 PM directly to 8:00 PM the next day. Likewise, the filter can be used to show only channels in a particular category, such as only movies channels or sports channels, or channels specifically selected by a user as their "favorites" channels.

Figure 2:
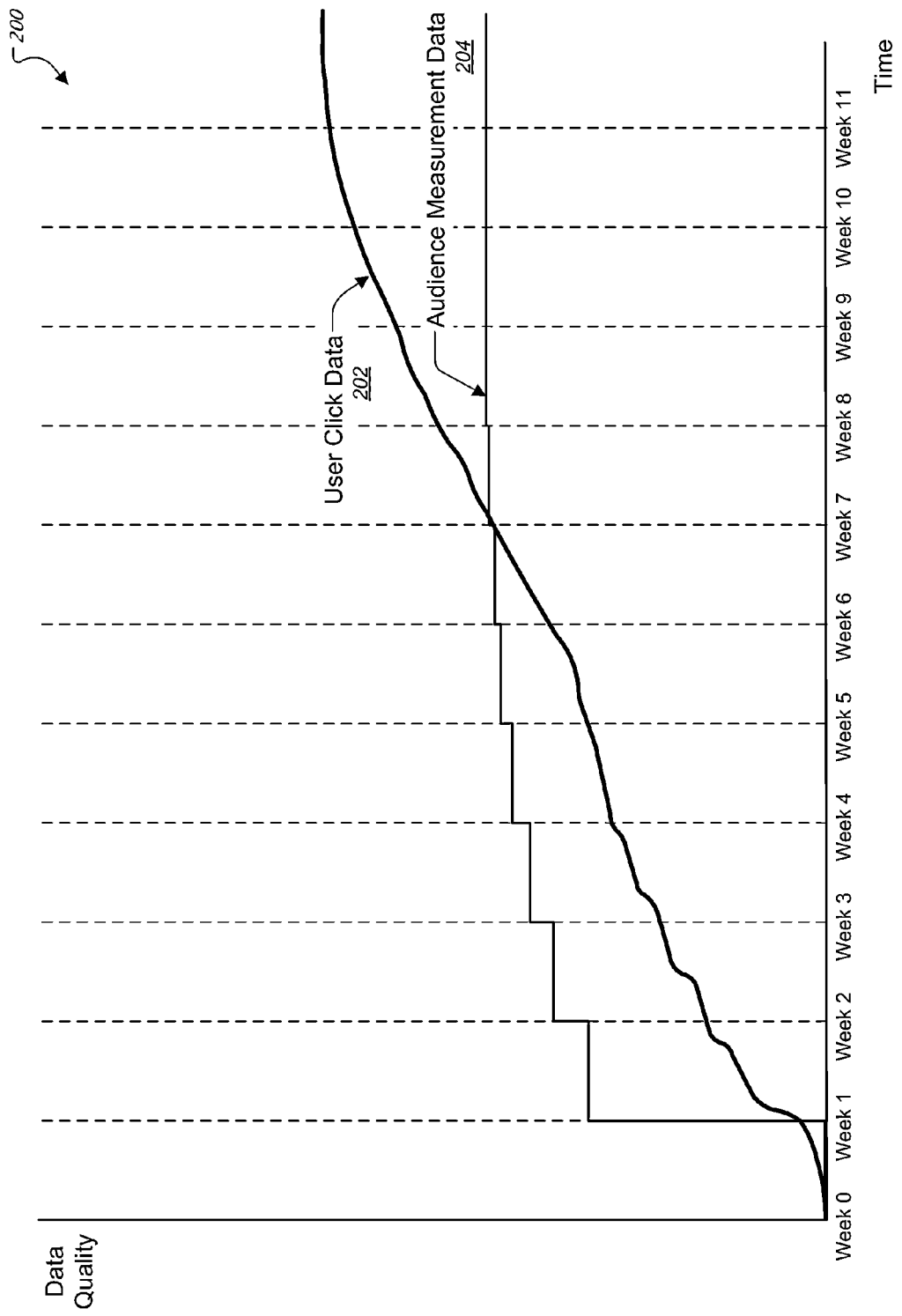
FIG. 2 shows a graph of a general correlation between two forms of audience preference data over time.

FIG. 2 shows a graph 200 of a general correlation between two forms of audience preference data over time. Specifically, the graph 200 depicts the relationship in data quality related to available audience preference data over time. The graph's vertical axis is data quality, and its horizontal axis is time. The time is measured in weekly increments (e.g., Weeks 1-11) which can correspond, to the availability of new audience data available after weekly showings of a TV program. The graph 200 includes a user click data line 202 and an audience measurement data line 204. The height of the lines 202 and 204 represent relative data quality over time. For example, the line 202 represents the quality of user click data 202.

Initially, both lines 202 and 204 represent zero quality, such as at Week 0 when a TV show first airs. At this early stage in a TV program's existence, the height of line 202 demonstrates that a common problem in data quality for collaborative filtering can be "lack of data" for newly registered users and newly added items. In particular, the graph 200 shows that user click data may not be present initially for a media-related program. For example, when a program first premiers, no one knows about it, and few users have made searches for it. Also, there are very few websites related to it, so that there is very little to click to. In contrast, audience measurement data can be determined immediately, and provides some indication of the popularity of a program. Such data may also be broken out into various demographic topics that can be used for correlating interests of a first user with interests of other users so that recommendations may be made more personalized.

At Week 1, for example, user click data 202 may achieve a relatively small, but not zero, data quality. In contrast, the audience measurement data 204 may increase significantly, for example, as the first week of audience ratings are available for the show. In this way, the quality of audience measurement data 204 exceeds that of user click data 202, at least early in the TV show's existence.

At Weeks 2-7, audience measurement data 204 can continue to grow, for example, at a slower rate than that of the Week 1 spike. Over time, audience measurement data 204 may tend to level off, for example, as Nielson ratings provide less and less additional information related to the show. During the same time, however, the data quality of user click data 202 can continue to grow significantly as increasingly more users watch the show and provide their input. As depicted at Week 7, the data quality of user click data 202 may eventually surpass that of the audience measurement data 204, which has essentially leveled off. In this way, the potential long-term superiority of user click data 202 can exceed the data quality of audience measurement data 204. In particular, the click data may be more accurate and may also be available to organizations without having to make payments to traditional data gathering organization or without having to set up traditional data gathering systems.

As can be seen in FIG. 2, the audience measurement data 204 shows average audience popularity, or data quality, for each episode and tops out over time. In addition, the user click data 202 also tops out, but here shows additional popularity, or data quality, for a particular program as compared to audience measurement data 204. Different reasons can exist for the data quality of user click data 202 to surpass that of audience measurement data 204. Specifically, perhaps the program has interest that cannot be captured by traditional audience measurement data 204. For example, user click data 202 may include data corresponding to a rabid interest among certain fans in a particular demographic. In another example, user click data 202 may be based on user viewing via mediums such as online media stores and DVDs.

In order to benefit from the data quality that varies in time for user click data 202 and audience measurement data 204, the recommendation engine may transition in how it uses the data over time. For example, the recommendation engine may initially rely on audience measurement data 204 for a few weeks after a new TV program airs. The recommendation engine may transition into using user click data 202 once such additional data is available in large enough numbers to be reliable.

Figure 3:
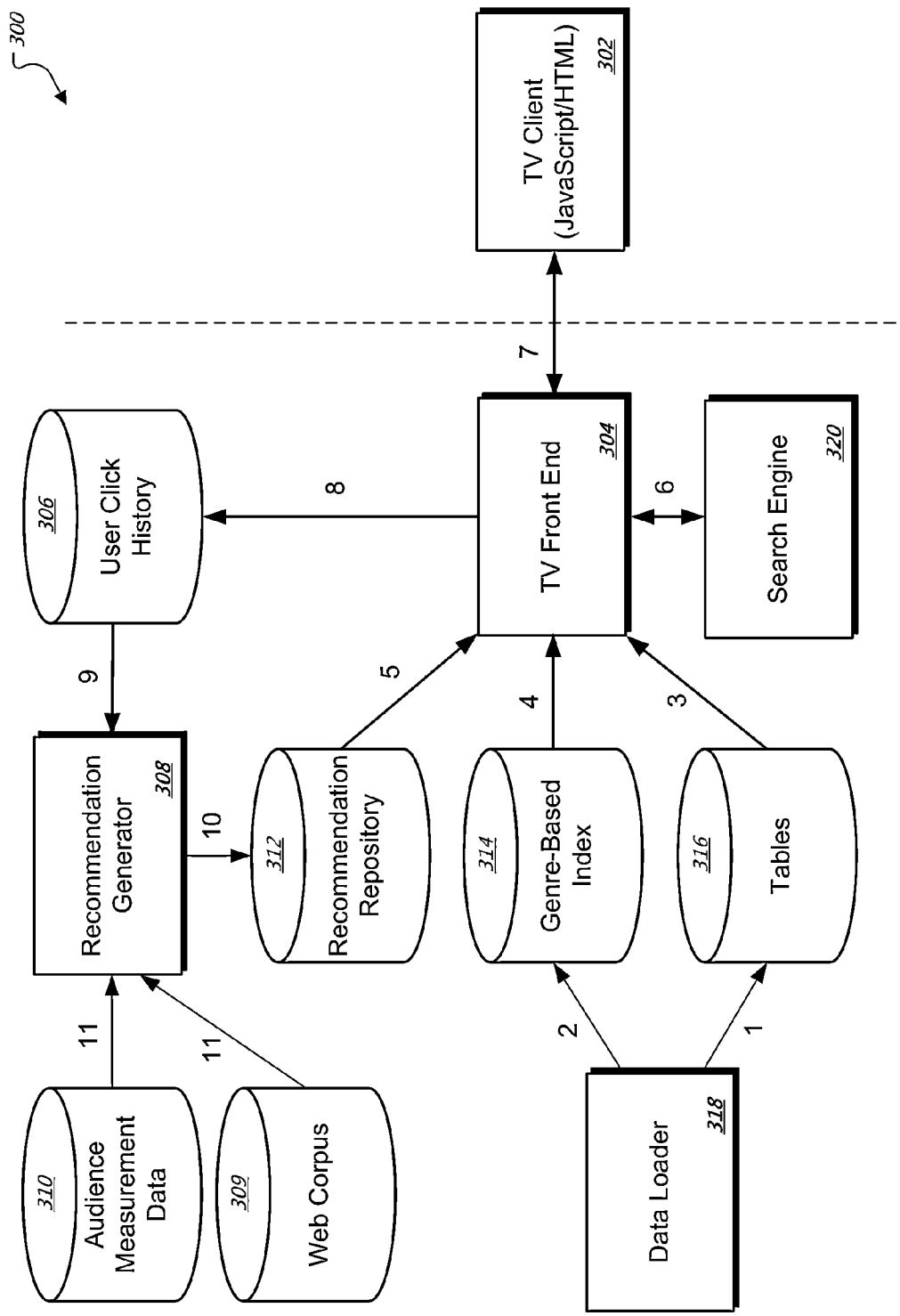
FIG. 3 is a schematic diagram of a computer-implemented system for providing media-related recommendations over a network.

FIG. 3 is a schematic diagram of a computer-implemented system 300 for providing media-related recommendations over a network. The system 300 includes a TV Client 302 (e.g., implemented in JavaScript, HTML, Flash, etc.) that is communicatively coupled to a TV front end 304. The TV Client 302 can serve as the user interface for the user's interaction with the TV, such as for searching for TV shows and receiving recommendations. TV front end 304 can serve as the behind-the-scenes interface for searching media programming, storing user click information, processing recommendations, etc.

A user-click history 306 can store user click information received from the TV front end 304. For example, the user click information can track a user's preference for TV shows, such as the genre of TV shows, the names of particular programs, the names of particular personalities, etc.

A recommendation generator 308 can use data from the user-click history 306 to generate recommendations based on various attributes. In this sense, the recommendation generator 308 can serve as the "recommendation engine" described above. The recommendation generator 308 can also use audience measurement data 310 in generating recommendations. For example, the audience measurement data 310 may represent viewer popularity collected over time, such as by Nielson ratings. Moreover, the recommendation generator may also draw upon corpus data 309, which may include information such as blogs, media-directed web sites, and other such media-directed web content. Such information may likewise be used to discern relationships between and among particular programs for purposes of determining whether two programs are sufficiently related that a recommendation can be made for one based on a determination that a user is interested in the other.

A recommendation repository 312 can store recommendations produced by the recommendation generator 308. Such recommendations may be stored for a short or long periods of time, and may be purged when determined to be obsolete. Recommendations from the recommendation repository 312 can be used by the TV front end 304 when recommendations are to be displayed to the user.

A genre-based index 314 can contain information about TV shows organized by genre. Genre ratings may reflect, for example, the popularity of particular programs and/or stations. The genre-based index 314 can be used by the TV front end 304 when genre-based information is needed.

Tables 316 can include information used by the electronic program guide, such as information that is used to build individual cells in a program guide grid. Information from the tables 316 may be provided to the TV front end 304 when, for example, the user first displays a programming guide grid.

A data loader 318 can load information into the genre-based index 314 and tables 316. The information that the data loader 318 uses may be provided by TV programming providers (e.g., networks, cable stations, satellite companies, etc.) In particular, the data loader 318 may receive and load channel line-up and schedule information (e.g., from a commercial provider), such as information indicating that, at 5 PM, Robot Chicken is on Comedy Central on Channel 15. It may also concert such data into a form, such as particularly formatted tables, that can be loaded by the front end 304. The recommendation generator 308 may also relies on the tables 316 in order to generate a recommendation repository.

A search engine 320 can service program media search requests received by the TV front end 304. For example, a search query entered by a user on the TV client 302 can be received by the TV front end 304 and provided to the search engine 320. The search engine 320 can provide the results of the search to the TV front end 304 for use by the TV client 302.

In one example process flow of the system 300, processing can begin at arrows 1 and 2 when the data loader 318 generates genre-based index 314 and tables 316. The data loader 318 may use various sources of information in generating the tables 316, such as information provided by TV programming providers. When updating the genre-based index 314, additional indexes may be added that allow the information to be sorted by genre code of the program and sub-sorted by the popularity score based on given ratings-based popularity of stations and program. Inputs to the data loader 318 may be in the form of text files, one or more for each station, and may optionally include program popularity.

In the next step (e.g., at arrow 3), the TV front end 304 can use information from the tables 316 to load tables for the programming guide grid, etc. The process of loading the grid can occur, for example, when the user first clicks on the TV, or as updated information is available.

At the same time (e.g., at arrow 4), the TV front end 304 can use information from the genre-based index 314 to load genre-related tables corresponding to programs that the user can view, search or receive recommendations. The process of loading the genre-related tables can occur, for example, when the user first clicks on the TV, or as updated information is available.

Once the TV front end 304 has sufficient data to service initial user requests (e.g., steps corresponding to arrows 1-4 are complete), the user can begin to make requests using the information. For example, the user may be watching TV and select a control to display the program guide grid. The TV client 302 can report the selection back to TV front end 304. To respond to the request, the TV front end 304 can provide the grid data to the TV client 302 for display, for example, on the TV screen.

Providing the program guide grid may correspond, for example, to a search request made by the user for particular programming. For example, the program guide grid may contain TV show listings corresponding to search terms that the user enters on the TV client 302. The TV front end 304 can receive the query via arrow 7, and provide the search query to the search engine 320 via arrow 6. The search engine 320 can process the query and provide the search results to the TV front end 304, which can provide the search results to the TV client 302 for display, for example, on the user's TV, in a manner like that discussed above.

Over time, user activity on the TV client 302 collected by the TV front end 304 (via arrow 7) may be provided to the user click history 306 via arrow 8. Such user activity may include user actions that can be used later, for example, in formulating recommendations. For example, the user actions may include inputs by the user on the Internet that relate to particular TV programs or stations. In this way, the recommendations can be based, at least in part, on the collaborative filtering approach described above or other similar approaches. Moreover, when more than one user is involved, recommendations using the collaborative filtering approach are "behavioral data-based recommendations" because they can use input from many users to "train" the recommendation engine.

To generate recommendations, the recommendation generator 308 can use data from the user-click history 306 (e.g., corresponding to user inputs received over time) via arrow 9, and audience measurement data 310 via arrow 11. The recommendations that are generated can be stored in the recommendation repository 312 via arrow 10. Such newly-generated recommendations can be used (by arrow 5) by the TV front end 304 as they are updated in the recommendation repository 312.

Figure 4A:
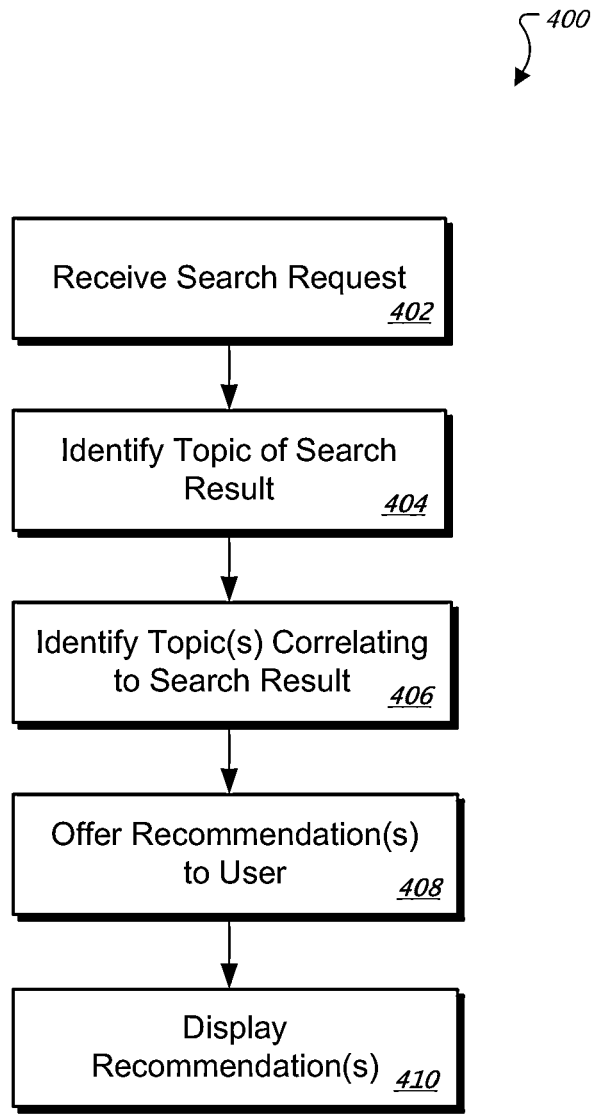
FIG. 4A is a flow chart of a process for providing media-related recommendations in response to a search query.

FIG. 4A is a flow chart of a process 400 for providing media-related recommendations in response to a search query. In general, the process 400 shows that recommendations are based on the topics corresponding to the search results. For example, the recommendations may be made for media search results for a user at a client who is browsing media programming information, such as in the screen shots shown in FIGS. 1A through 1C.

At box 402, the system receives a search request, which may have been submitted through a search request box for a standard search engine. For example, the search request may correspond to a search query (e.g., "the tonight show") entered by a user in search box 108. The system identifies the topic of the search result at box 404. The topic may correspond, for example, to media programming that matches keywords in the search result (e.g., based on the search query). For example, the topic of the search result based on the search query "the tonight show" may include talk shows such as The Tonight Show With Jay Leno.

At box 406, the system identifies topics correlating to the search result. The correlation may include, for example, the genre of programming that corresponds to programs matching those topics of the search result. For example, genre-based correlations may correlate other talk shows even if the titles of the shows don't match terms in the search query. The correlation can also include other media programming that may be related to the shows in other ways. For example, if the search result includes a Tonight Show With Jay Leno episode featuring Kiefer Sutherland, the correlation may correlate other media programming related to Kiefer Sutherland, such as other TV shows, movies, etc. The correlation can also use information from other sources, such as user profiles. For example, if the user's user profile identifies a preference for Kiefer Sutherland, that information can be used in the identification of topics correlating to the search result.

At box 408, the system offers the recommendations to the user. For example, the recommendations may be sent to the user's TV and made available with the search results that matched the user's search query. In some implementations, the recommendations may be offered, but not necessarily displayed until the user opts to display the recommendations. For example, referring to FIG. 1A, the recommendations may not be displayed until the user selects the recommendation link 110.

At box 410, the system displays the recommendations. For example, referring to FIG. 1B, the recommendations may be displayed on the landing page 104 as recommendations 131*b*. In another example, referring to FIG. 1C, the recommendations may be displayed as recommendations 142. Regardless of how the recommendations are displayed, they are one step removed from the search results. Specifically, the recommendations correspond to the topics associated with the search results, but are not a subset of the search results themselves.

Figure 4B:
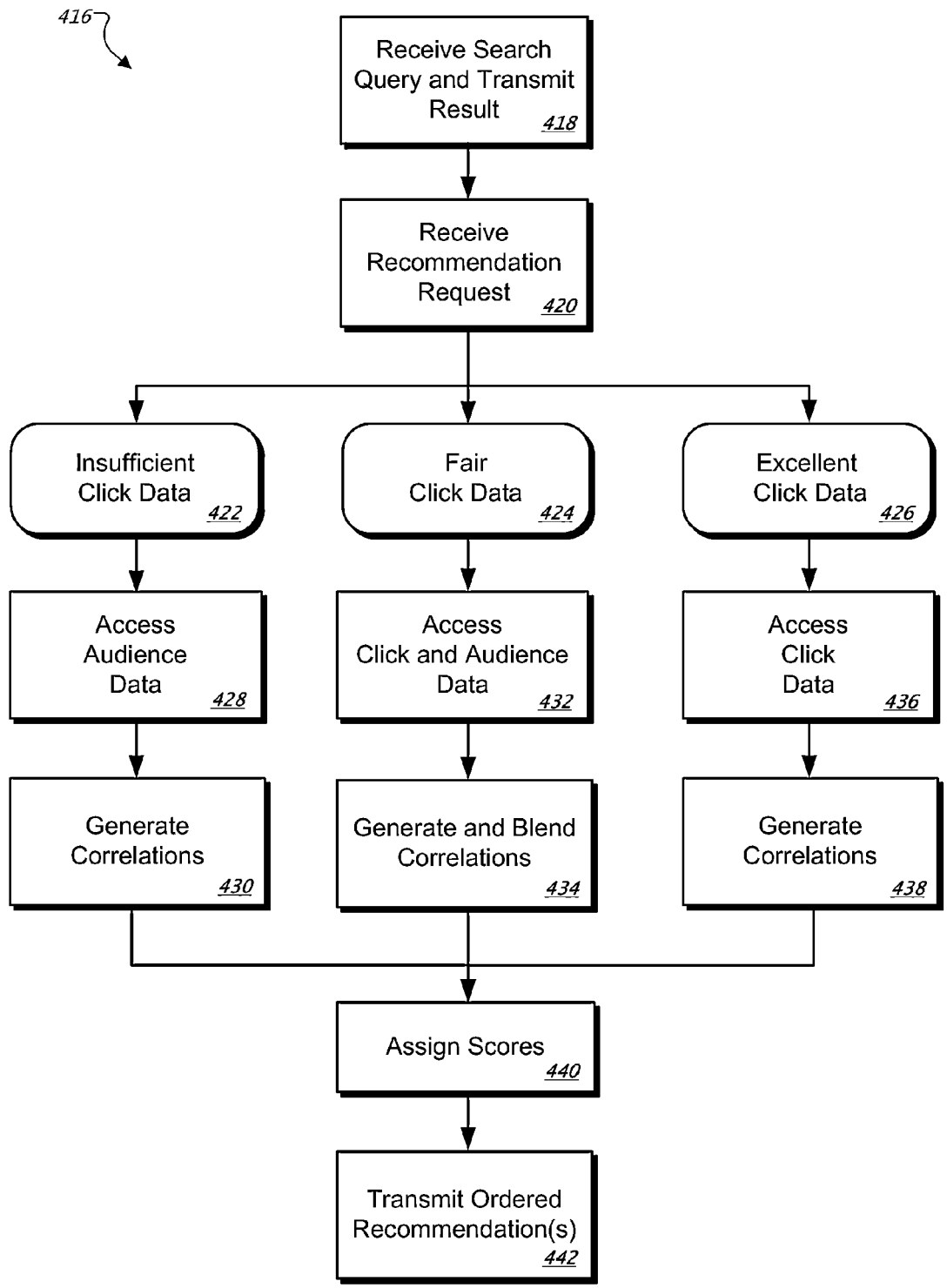
FIG. 4B is a flow chart of a process for providing media-related recommendations.
Figure 4C:
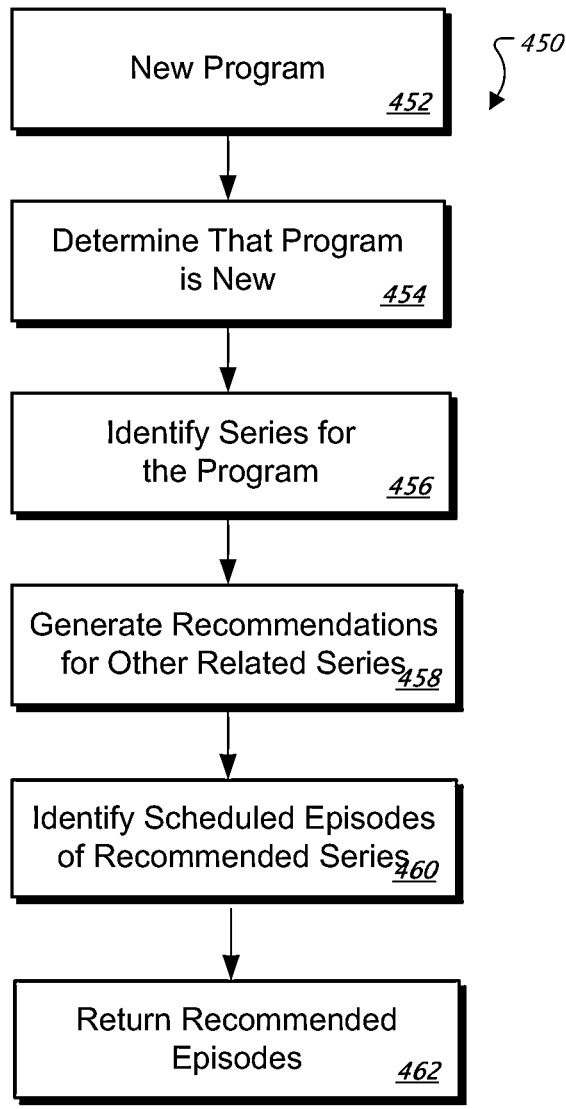
FIG. 4C is a flow chart of a process for providing media-related recommendations for new programs

FIG. 4B is a flow chart of a process 416 for providing media-related recommendations. The process 416 shows how the recommendation engine may determine when to use user click data, traditional audience measurement data (or other such popularity determining data), or both. Specifically, the process 416 shows the switchover over time from traditional audience measurement data to user click data. The switchover may occur, for example, as the data quality of user click data is considered to be a higher quality than that of audience measurement data. In certain implementations, audience measurement data may always be used to some extent, and be blended with other data for making recommendations. Various weightings, from zero to 100%, may be given to the various inputs described here and other inputs, in handling various inputs for a recommendation system and process.

The recommendation engine can use such data quality considerations in making recommendations. For example, when insufficient user click data is available, the process can use traditional audience measurement data in generating recommendations. By contrast, when excellent user click data exists, the recommendation engine may base its recommendations more-so, or in some situations, even exclusively, on user click data. Finally, when fair (e.g., somewhere between insufficient and excellent) user click data is available, the recommendation engine may use a combination of both types of data. In this case, the two types of data may be blended in some way, such as in the union of recommendation sets from both sources.

At step 418, the system receives a search query and transmits the results. For example, referring to FIG. 1A, the user may enter a search query such as "the tonight show" in the search box 108. As a result, the system may provide search results matching the query, such as media result groupings 116.

At step 420, the system receives a recommendation request. For example, the recommendation request may be made automatically on the user's browser, or the user may initiate the request by selecting a control such as the recommendations link 110.

At this point in the process 416, the recommendation engine can assess the quality of available user click data and traditional audience measurement data. As described above in regards to the collaborative filtering approach, the availability and quality of data over time can change. For example, there may be a "lack of data" for newly registered users and new TV programs. Specifically, new TV programs can exhibit a "cold start problem." Initially, the quality of user-click data may be poor, but may improve over time. By contrast, the quality of audience measurement data may be good after the first several episodes of a TV program, but its quality may level off over time. If insufficient-quality user click data is available at box 422, the left branch of the flow diagram of FIG. 4B can be used. If fair-quality user click data is available at box 424, the center branch of the flow diagram can be used. If excellent-quality user click data is available at box 426, the right branch of the flow diagram can be used.

When insufficient-quality user click data is available at box 422, the system accesses audience data at box 428. For example, the audience data accessed may be from various audience ratings measures that are updated and available, for example, when a TV show airs each week. The system generates correlations at box 430. Correlations can be made, for example, between the audience measurement data and the topics associated with the search results. For example, the correlations may associate certain genres of TV shows that are popular with audiences with the TV shows identified in the search results.

When excellent-quality user click data is available at box 426, the system accesses user click data at box 436. For example, the user click data may include input received from users over time, such as on websites that may collect user reactions to TV shows. The system generates correlations at box 438. Correlations can be made, for example, between the user click data and the topics associated with the search results. For example, the correlations may associate certain TV stations or TV show episodes that are popular with users with the TV shows identified in the search results.

When fair-quality user click data is available at box 424, the system accesses a combination of user click data and audience measurement data at box 432. The system generates and blends correlations at box 434. The two types of data may be blended so that the data quality of each data type can be exploited. For example, while the audience measurement data may indicate a show is very popular among TV viewers, user click data may provide additional insight that is not tracked or available, for example, by audience participation measures. In particular, the user click data may identify, for example, a theme or observation that the TV producers have not considered (that audience participation data does not consider). In another example, while the audience measurement data may indicate an initial strong popularity of TV audiences, user click data may indicate that users are just starting to tire of the TV show. Subsequent correlations are then made between both data sources and the search results.

Blending can be done in different ways. For example, blending may use a mathematical model that considers the quality of data sources over time. Early in a show's life (e.g., after a few weeks), the mathematical model may use a higher percentage (e.g., 70-90%) of information from audience measurement data, and a lesser percentage (e.g., 10-30%) of information from user click data. When both types of data are expected to have similar qualities, the percentages may be 50-50. Late in a show's life, such as after the show is in reruns, blending may use a much higher percentage (e.g., 90%) of user-click data.

User click data can also be blended with personalized information such as a user's age, hobbies, or other interests. This type of information may be available, for example, from user profiles. In some implementations, users may be notified that their personalized information is being used in generating recommendations, and the user may be able to optionally block such use of their personalized information. In this manner, the system can help dispel some concern about privacy issues.

The blending and correlating can change over time due to the nature of the different approaches (e.g. "collaborative filtering" and "content-based recommendation.") As described above, the collaborative filtering approach uses input received from many users to "train" the recommendation engine. When sufficient user input is available, the recommendation engine can rely such user input in making correlations. The contribution of collaborative filtering can improve over time, for example, as more users provide input on specific TV shows. At the same time, the recommendation engine can typically always use the content-based recommendation approach, analyzing the content itself to find out the similarity of items.

The content-based recommendation approach, as described above, can analyze the content itself to determine the similarity of items, and may use models: genre-based, filter-based, and filter-based using extra data. When the genre-based model is used, the correlations can be made, for example, between TV shows of the same type (e.g., late night talk shows). The correlations may be based on a combination of genre data (e.g., from EPG provider) and ratings based popularity data (e.g., for stations and/or programs). The model can use genre field values to find sets of similar programs. The sets may then be ranked by popularity of the station (e.g., where program airs) or popularity of series itself (e.g., if data is available).

When the filter-based model is used, a filter can be used to analyze the similarity of the programs. The filter can determine "matching clusters" of the programs to determine set of programs that fall into the same category (or cluster).

When the model used applies extra data to the filter process, better clustering can result. Such extra data may include, for example, closed caption data, blogs, or some web site contents that extensively describe the program. In this sense, this third model is an extension of the second model.

At box 440, the system assigns scores to the recommendations that have been generated, such as by generating and blending correlations in boxes 430, 434 and 438. Scores may be based on how well a recommendation correlates to the topic of the search result. For example, a recommendation that correlates in multiple ways to the search results may receive a higher score than one that correlates in fewer ways. For instance, if the query results are associated with Kiefer Sutherland, recommendations that correlate to Kiefer Sutherland can be scored higher. Moreover, if information in the user's personal information indicates a liking for Kiefer Sutherland, the corresponding recommendations may be scored higher yet.

At box 442, the system transmits ordered recommendations. The recommendations may be sorted based on the scores assigned in box 440. In this way, when the user receives the recommendations, the highest scoring recommendations may be display first or at the top of the list.

FIG. 4B is a flow chart of a process 450 for providing media-related recommendations for new programs. In general, the process 450 shows one example for handling requests relating to new or relatively new programs, and generating recommendations relating to such programs, At box 452, an identification of a new program is received. For example, a user may have selected the program from an upcoming area of an electronic program guide grid, or may have entered the title of the program after seeing promotional ads for the upcoming program.

At box 454, the process 450 determines that the program is new. For example, the process 450 may attempt to check such entries against media-related click and/or audience measurement data, and may not find data in sufficient numbers. The system may infer from such lack of data that the program has not appeared before, at least not in wide release. Thus, at box 456, the process 450 may identify a series associated with the program. Using the series identification, the process at box 458 may identify other series have sufficiently relating factors, such as common genres, plot descriptions, actors, etc., that those other series may be deemed to be something in which a user would be interested, given the user's interest in the first episode. In such a situation, the recommended programs may be ranked according to a degree of commonality with the initial episode, by popularity measures of the other programs, or both.

With a particular recommended series identified, the process 450 then searches for episodes of the program that will be airing in the near future, such as in the next several hours or next several days or weeks. Information about these episodes may then be returned to the user (box 462), and the user may be given the opportunity to review them, such as by adding one or more episodes to a personalized channel for the user. This process 450 is thus one example of an approach to be used in providing recommendations for relatively new programs. While the episode is reviewed based on a its series cluster, the episode could also be assigned to a variety of other clusters, and those cluster may be used for making recommendations like those discussed here.

Figure 5:
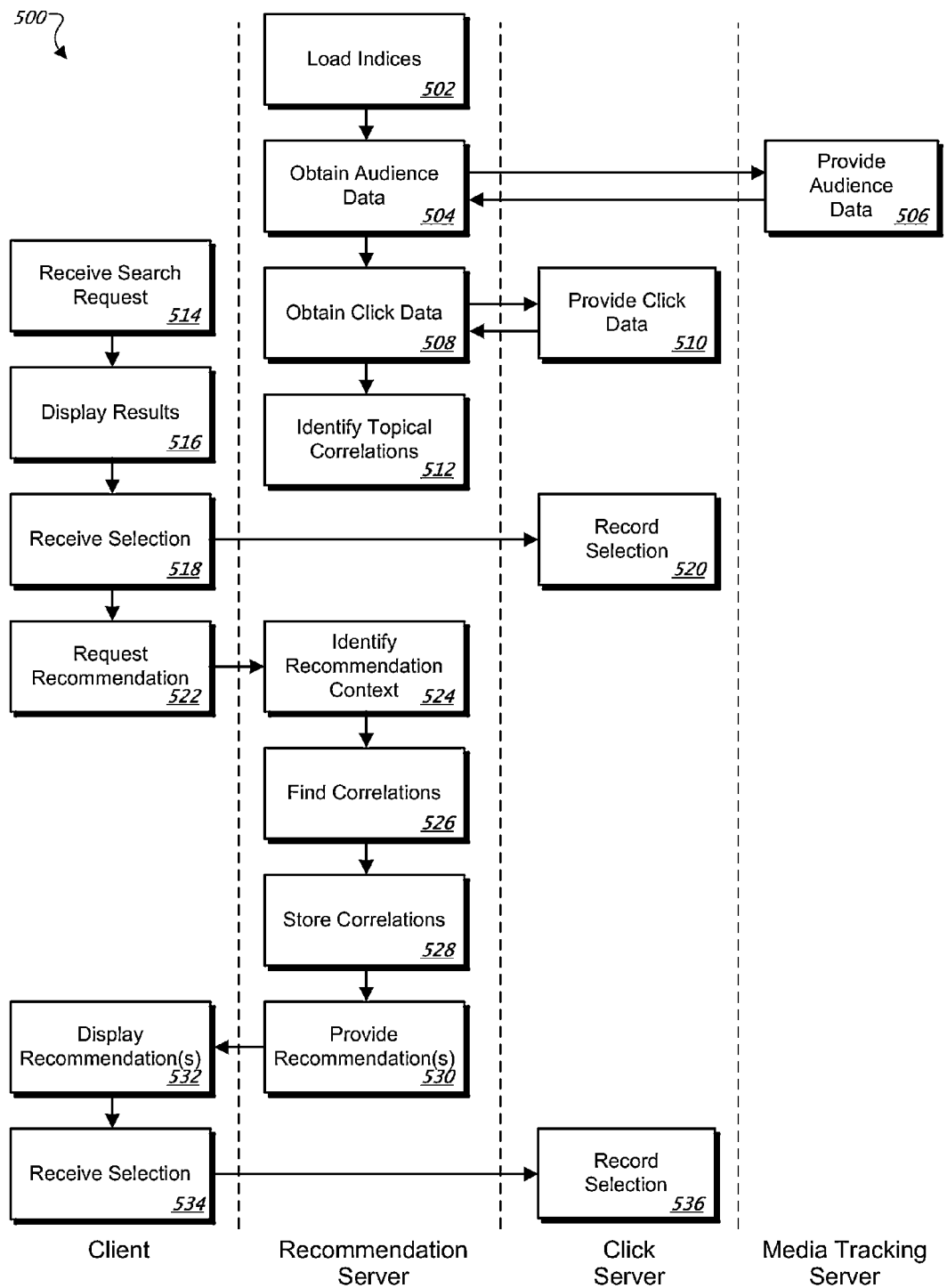
FIG. 5 is a swim lane diagram showing interaction of various components in a media-related recommendation process.

FIG. 5 is a swim lane diagram showing interaction of various components in a media-related recommendation process. As depicted, the components include a client, a recommendation server, a click server and a media tracking server. The client can correspond, for example, to the user's TV set. The recommendation server can be, for example, computer software that generates recommendations corresponding to search results matching a user's search query for media programming. In general, the recommendation server may actually provide recommendations for all sorts of things, including any media related recommendations. The click server, for example, can logically include the set of various online websites, etc., that receive input from users, such as users who provide their feedback and opinions regarding TV shows. In one example, the click server can be a general program at a company like Google that tracks clicks for various sorts of applications. The media tracking server, for example, may be a media tracking server run by a company like Nielsen.

At box 502, the system loads indices, such as indices corresponding to TV programs, etc. Index loading can be performed by the recommendation server, which may set up the indices in preparation for receiving audience data corresponding to the TV shows.

At box 504, the recommendation server obtains audience data. For example, the recommendation server may request the audience data for a particular show from the media tracking server. In some implementations, the recommendation server may be configured to automatically receive audience data from the media tracking server, such as on a scheduled basis (e.g., when the audience ratings are updated after each week's showing of a particular show).

The media tracking server provides the audience data at box 506. The audience data provided can be in response to a specific request by the recommendation server, or it may be, for example, a scheduled transmission of audience data.

The recommendation server obtains user click data at box 508. Obtaining user click data for a particular program can begin almost immediately, for example, such as when users begin commenting on TV programs that have just aired (or are soon to air) on TV.

The click server provides the click data to the recommendation server at box 510. For example, the click data provided can be in response to click data requested by the recommendation server, such as for a particular TV show. Obtaining updated click data can occur over time, effectively incorporating better or additional click data that may represent newer input from users.

The client receives the search request at box 514. For example, referring to FIG. 1A, the search request may be based on a search query that the user enters in the search box 108 to find media programming related to query "the tonight show".

The client displays the results at box 516. The results may be a list of search results, such as a list of TV shows related to the search query. For example, in response to the search query "the tonight show," the system may display media result groupings 116 that include other talk shows, etc.

The client receives the selection at box 518. The selection refers to the selection made by the user, for example, from the media result groupings 116. For example, the user may select (e.g., by clicking on) one of the shows in the media result groupings 116, or the user may perform some other action on the page. The client can notify the click server of the one or more user clicks.

The click server records the selection at box 520. Based on the user selection received by the client, the click server can add the user action to its collection of user click data. In this way, the click server can track user clicks of multiple users over time. The user click data that the click server records may be indexed in various ways, such as by user, title (e.g., TV show name and/or episode), media type (e.g., TV, etc.), genre (talk show, game show, drama, etc.), TV show (or movie name), personality (e.g., actor, entertainer, guests, etc.), or other attributes. Such indices can form the basis for the recommendation engine to use the "collaborative filtering" approach as described above.

The client requests recommendations at box 522. For example, referring to FIG. 1B, the user may select the recommendations link 131a in order to request the display of media recommendations 131b. In another example, referring to FIG. 1A, the user may select the recommendations link 110 in order to request the display of details page 106 containing the media recommendations 142. The recommendation request can be sent to the recommendation server and may identify the search results matching the user's original search query. The request may also identify whether the user's personalized information is to be used to form the recommendations.

At box 524, the recommendation server identifies the recommendation context. The context identified depends on the recommendation request received from the client. For example, the recommendation server may identify the context using the search results corresponding to the search query. The context identified may include the genre of media programming or the names of personalities associated with the media programming. The context may also incorporate the whether the user's personalized information is to be used to form the recommendations.

The recommendation server finds correlations at box 526. For example, the correlations may be formed among media programming forming the basis of the recommendations. The correlations may, in some implementations, use the topical correlations generated at box 512. In some implementations, the correlations can include the use of clustering, such as correlations based on common keywords, etc.

At box 528, the recommendation server stores the correlations. Storing the correlations can eliminate the need to recalculate similar correlations later, such as when additional media recommendations are generated for similar circumstances (e.g., similar search results, similar genre, etc.).

The recommendation server provides recommendations at box 530. For example, the recommendation server can provide the recommendations to the client for display. The recommendations provided may be those that have just been generated, or those that have been accessed from storage, of some combination of both.

The client displays recommendations at box 532. For example, referring to FIGS. 1B and 1C, the recommendations received from the recommendation server may be displayed as media recommendations 131b or media recommendations 142.

The client receives the selection at box 534. For example, in response to the recommendations displayed, the user may select one or more of them to review, etc. In particular, the user selection may trigger the client to display additional information associated with the recommended media program. Such user selection can also represent user click data indicating, for example, the popularity of a particular TV program.

The click server records the selection box 536. For example, based on the selection that the user made from the displayed recommendations on the client, the click server can update the user click data that the click server maintains. Updating the user click data over time can allow the click server to provide click data (at box 510) as needed to the recommendation server.

Figure 6:
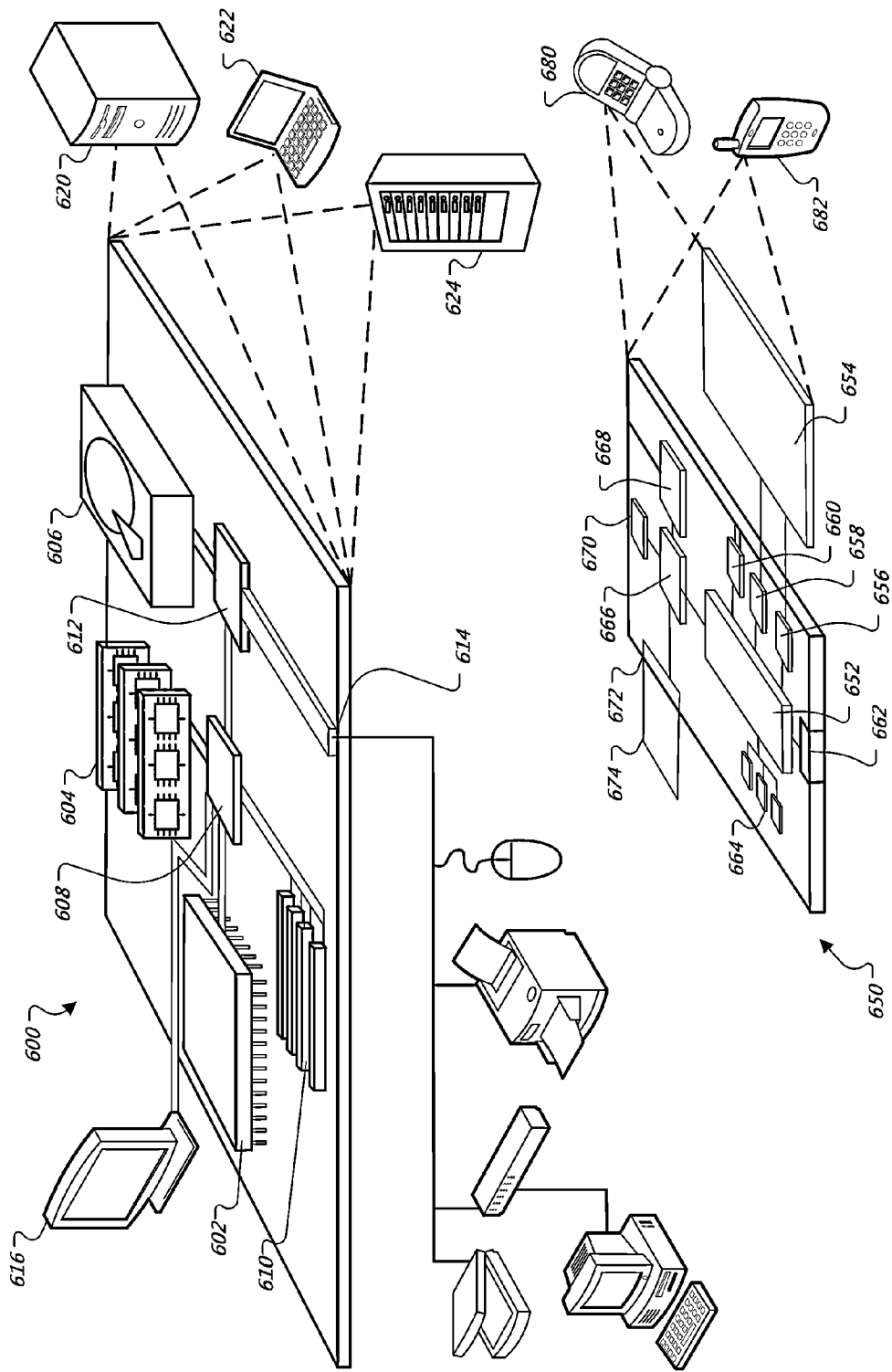
FIG. 6 shows an example of a computer device and a mobile computer device that can be used to implement the techniques described here.

FIG. 6 shows an example of a computer device 600 and a mobile computer device 650 that can be used to implement the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made. For example, various forms of the flows shown above may be used, with steps re-ordered, added, or removed. Also, although several applications of the electronic program guide systems and methods have been described, it should be recognized that numerous other applications are contemplated. Moreover, although many of the embodiments have been described in relation to electronic program guides, that term should be understood to include various forms of mechanisms for displaying media-related content and scheduling information for such content. Accordingly, other embodiments are within the scope of the following claims.

What is claimed is:

1. A computer-implemented method, comprising:
   receiving, at a computer system, information that indicates interest by a user in one or more media programs;
   obtaining information that indicates popularity for a plurality of media programs that are responsive to the received information, and identifying a host series to which at least one of the plurality of media programs corresponds, the host series representing a group of multiple media program episodes that cover a common topic;
   identifying one or more other media programs that are not episodes of the host series based at least in part on the identification of the host series, a level of relevance of the one or more other media programs to the host series, and the information that indicates interest, by the user, in particular ones of the media programs; and
   generating and providing, for presentation to the user, a recommendation of the identified one or more other media programs.

2. The method of claim 1, wherein the received information comprises an explicit query provided by the user.

3. The method of claim 1, wherein the identified host series is a host series of a media program other than the media program in which the user indicated an interest.

4. The method of claim 1, wherein the received information includes information that identifies media programs that the user has viewed.

5. The method of claim 1, wherein one or more recommendations are generated based at least in part on a series identifier for the host series.

6. The method of claim 1, further comprising generating, and providing with the recommendation, data for displaying an electronic program guide grid that includes the one or more recommendations.

7. A non-transitory computer-readable medium storing software comprising instructions executable by one or more computers which, upon such execution, cause the one or more computers to perform operations comprising:
   receiving, at a computer system, information that indicates interest by a user in one or more media programs;
   obtaining information that indicates popularity for a plurality of media programs that are responsive to the received information, and identifying a host series to which at least one of the plurality of media programs corresponds, the host series representing a group of multiple media program episodes that cover a common topic;
   identifying one or more other media programs that are not episodes of the host series based at least in part on the identification of the host series, a level of relevance of the one or more other media programs to the host series, and the information that indicates interest, by the user, in particular ones of the media programs; and generating and providing, for presentation to the user, a recommendation of the identified one or more other media programs.

8. The non-transitory computer-readable medium of claim 7, wherein the received information comprises an explicit query provided by the user.

9. The non-transitory computer-readable medium of claim 7, wherein the identified host series is a host series of a media program other than the media program in which the user indicated an interest.

10. The non-transitory computer-readable medium of claim 7, wherein the received information includes information that identifies media programs that the user has viewed.

11. The non-transitory computer-readable medium of claim 7, wherein one or more recommendations are generated based at least in part on a series identifier for the host series.

12. The non-transitory computer-readable medium of claim 7, further comprising generating, and providing with the recommendation, data for displaying an electronic program guide grid that includes the one or more recommendations.

13. A computer-implemented system, comprising:
memory storing data relating to popularity of one or more media programs;
an interface configured to receive media-related requests and obtain information that indicates user interest in a plurality of media programs that are responsive to the received information, identify a host series to which at least one of the plurality of media programs corresponds, the host series representing a group of multiple media program episodes that cover a common topic, and to identify one or more other media programs that are not episodes of the host series based at least in part on the identification of the host series, a level of relevance of the one or more other media programs to the host series, and the information that indicates user interest in particular ones of the media programs; and
a programming guide builder to generate code for constructing a programming guide grid, and providing, for presentation to a user, a recommendation of the identified one or more other media programs in the guide.

14. The computer-implemented system of claim 13, wherein the recommendations are generated from audience participation data associated with the media programs.

15. The computer-implemented system of claim 13, further comprising a collaborative filter for determining co-dependency relationships between users and media programs.

16. A computer-implemented method, comprising:
receiving, at a computer system, information that indicates interest by a user in one or more media programs;
identifying one or more second media programs that are determined to have a genre that is the same as the genre for one of the plurality of media programs, and that have been assigned a status of newly available for viewing;
in response to determining that search and click data related to the interest of the user in the one or more media programs is unavailable, retrieving rating information for the one or more media programs and applying the rating information to the one or more second media programs; and generating and providing, for presentation to the user, a recommendation for one or more of the second media programs based at least in part on the rating information and the status.

17. The computer-implemented method of claim 16, further comprising:
obtaining information that indicates user interest, for users other than the user, in the one or more second media programs in response to determining that the ratings information and the status do not satisfy a predetermined measure; and
determining a weighting for the one or more second media programs, the weighting based at least in part on (i) the information that indicates user interest, (ii) the ratings information, and (iii) the status metric.

18. The computer-implemented method of claim 16, wherein identifying one or more second media programs comprises:
applying one or more collaborative filtering techniques to retrieved audience measurement data; and
generating and providing, for presentation to the user, a recommendation of media programs based at least in part on applying a predetermined weighting factor for each technique.

19. A non-transitory computer-readable medium storing software comprising instructions executable by one or more computers which, upon such execution, cause the one or more computers to perform operations comprising:
receiving, at a computer system, information that indicates interest by a user in one or more media programs;
identifying one or more second media programs that are determined to have a genre that is the same as the genre for one of the plurality of media programs, and that have been assigned a status of newly available for viewing;
in response to determining that search and click data related to the interest of the user in the one or more media programs is unavailable, retrieving rating information for the one or more media programs and applying the rating information to the one or more second media programs; and
generating and providing, for presentation to the user, a recommendation for one or more of the second media programs based at least in part on the rating information and the status.

20. The non-transitory computer-readable medium of claim 19, further comprising:
obtaining information that indicates user interest, for users other than the user, in the one or more second media programs in response to determining that the ratings information and the status do not satisfy a predetermined measure; and
determining a weighting for the one or more second media programs, the weighting based at least in part on (i) the information that indicates user interest, (ii) the ratings information, and (iii) the status metric.

21. The non-transitory computer-readable medium of claim 19, wherein identifying one or more second media programs comprises:
applying one or more collaborative filtering techniques to retrieved audience measurement data; and
generating and providing, for presentation to the user, a recommendation of media programs based at least in part on applying a predetermined weighting factor for each technique.

22. A computer-implemented system comprising:
one or more computers and one or more storage devices storing instructions that are operable, when executed by the one or more computers, to cause the one or more computers to perform operations comprising:

receiving, at a computer system, information that indicates interest by a user in one or more media programs;

identifying one or more second media programs that are determined to have a genre that is the same as the genre for one of the plurality of media programs, and that have been assigned a status of newly available for viewing;

in response to determining that search and click data related to the interest of the user in the one or more media programs is unavailable, retrieving rating information for the one or more media programs and applying the rating information to the one or more second media programs; and generating and providing, for presentation to the user, a recommendation for one or more of the second media programs based at least in part on the rating information and the status.

23. The computer-implemented system of claim 22, further comprising:

obtaining information that indicates user interest, for users other than the user, in the one or more second media programs in response to determining that the ratings information and the status do not satisfy a predetermined measure; and determining a weighting for the one or more second media programs, the weighting based at least in part on (i) the information that indicates user interest, (ii) the ratings information, and (iii) the status metric.

24. The computer-implemented system of claim 22, wherein identifying one or more second media programs comprises:

applying one or more collaborative filtering techniques to retrieved audience measurement data; and generating and providing, for presentation to the user, a recommendation of media programs based at least in part on applying a predetermined weighting factor for each technique.

* * * * *